United States Patent [19]

Whittenburg et al.

[11] Patent Number: 4,657,193
[45] Date of Patent: Apr. 14, 1987

[54] FOOD PROCESSOR FOR UNDER CABINET MOUNTING

[75] Inventors: Stephen L. Whittenburg, Overland Park, Kans.; David S. Morris; Albert V. Edmonds, both of Kansas City, Mo.; John McGaw, Markham, Canada; David D. McCormick, Trappe, Md.; William L. Bartlett, Santa Barbara, Calif.; Edward Cruz, Santa Barbara, Calif.; David Harding, Santa Barbara, Calif.

[73] Assignee: Rival Manufacturing Company, Kansas City, Mo.

[21] Appl. No.: 715,527

[22] Filed: Mar. 25, 1985

[51] Int. Cl.$^4$ .............................................. B02C 18/12
[52] U.S. Cl. ............................. 241/282.1; 241/285 R
[58] Field of Search ................... 241/37.5, 92, 282.1, 241/282.2, 101.2, 285 R, 199.12, 46.17

[56] References Cited

U.S. PATENT DOCUMENTS

| | | | |
|---|---|---|---|
| 2,284,155 | 5/1942 | Landgraf | 241/282.2 |
| 2,422,340 | 6/1947 | Clark | 241/199.12 X |
| 2,679,982 | 6/1954 | Thyle | 241/46.17 |
| 2,894,551 | 7/1959 | Otto | 241/37.5 |
| 3,856,220 | 12/1974 | Waters . | |
| 4,095,751 | 6/1978 | Artin | 241/37.5 |
| 4,117,980 | 10/1978 | Hartmann | 241/282.2 X |
| 4,143,824 | 3/1979 | Schiotani . | |
| 4,200,244 | 4/1980 | Sontheimer . | |
| 4,283,979 | 8/1981 | Rakocy et al. . | |
| 4,307,847 | 12/1981 | Sontheimer . | |
| 4,364,525 | 12/1982 | McClean . | |
| 4,387,860 | 6/1983 | Necas et al. | 241/282.1 |
| 4,609,156 | 9/1986 | Boele | 241/199.12 |

FOREIGN PATENT DOCUMENTS

| | | | |
|---|---|---|---|
| 1119145 | 12/1961 | Fed. Rep. of Germany | 241/199.12 |
| 1163505 | 2/1964 | Fed. Rep. of Germany | 241/92 |
| 2418672 | 11/1979 | France | 241/282.1 |

Primary Examiner—Mark Rosenbaum
Attorney, Agent, or Firm—Willian Brinks Olds Hofer Gilson & Lione Ltd.

[57] ABSTRACT

A food processor for cutting, comminuting and blending various culinary ingredients includes a drive unit which is expressly designed for installation on the underside of kitchen cabinets and at least one food receiving container having a rotating cutter assembly disposed therein. The rotating cutter assembly includes a pair of blades slidably mounted upon a shaft which food in opposite directions to improve the uniformity of cutting and blending. The food container is slidably received in the drive unit and a connection and release mechanism therein automatically interconnects the cutter assembly with an output drive member in the drive unit when the food container is fully seated therein. A release mechanism may be manually activated to disconnect the drive member prior to the removal of the food container from the drive unit.

19 Claims, 10 Drawing Figures

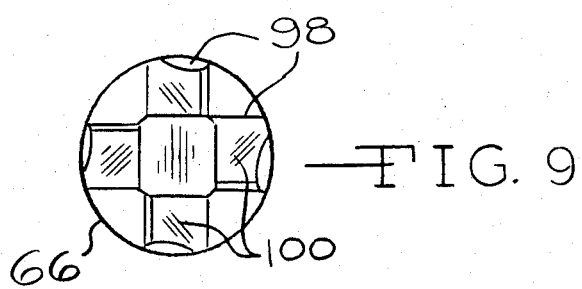
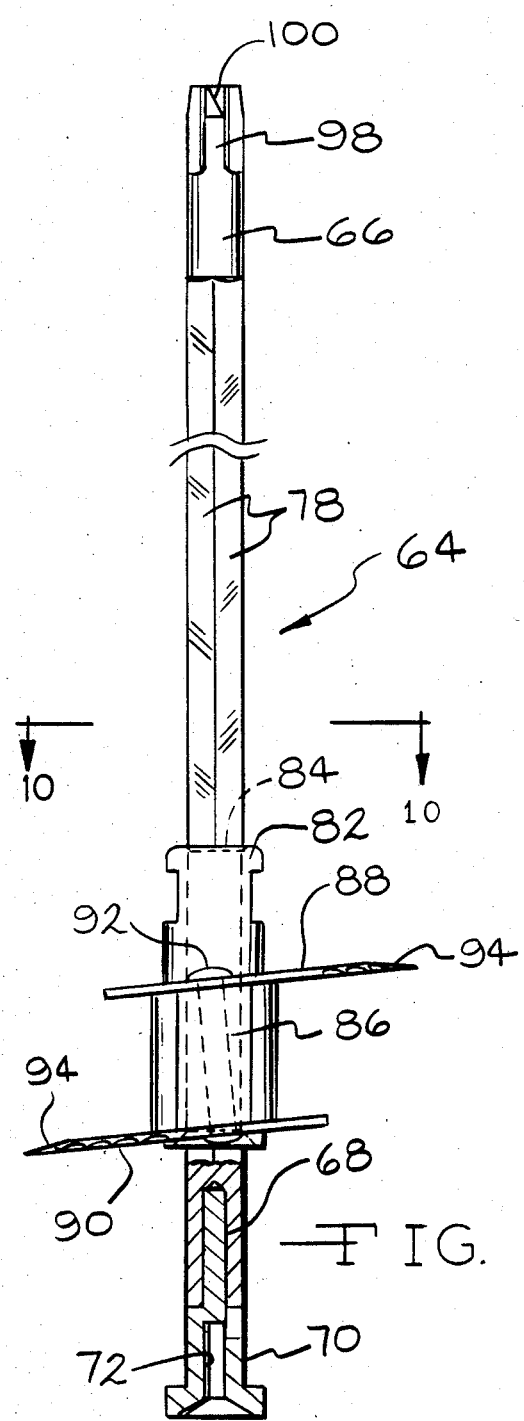
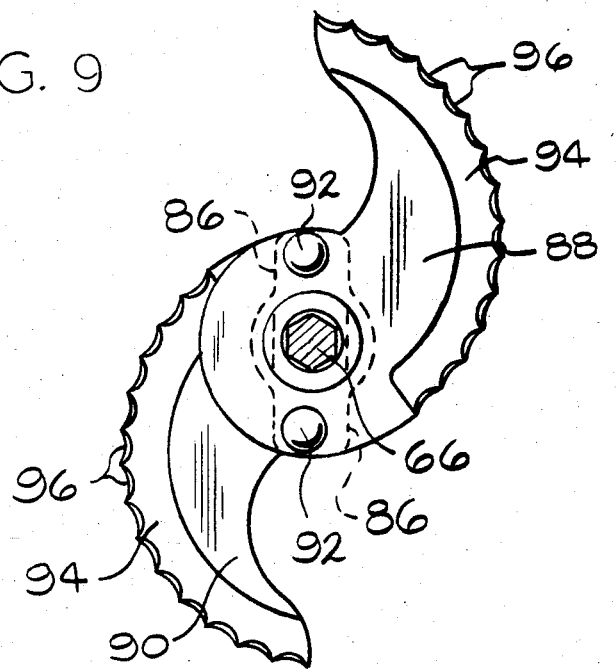
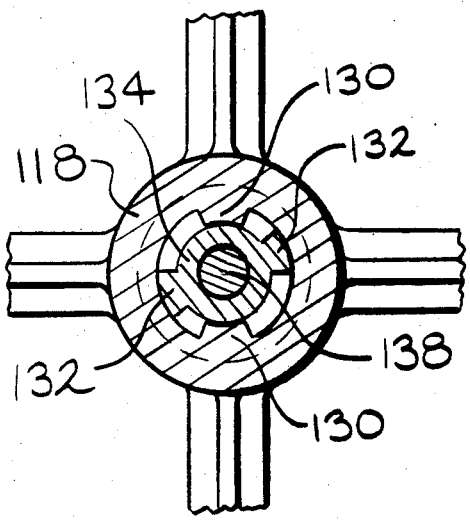

FOOD PROCESSOR FOR UNDER CABINET MOUNTING

BACKGROUND OF THE INVENTION

The invention relates generally to food processing equipment and more specifically to a food processor for mounting on the underside of a kitchen cabinet or the like. The food processor includes a drive unit which slidably receives a food container and has means for automatically connecting and disconnecting the drive unit output from a cutting assembly in the food container.

Food processors and similar food preparation devices have enjoyed great popularity in recent years. Such popularity is the result of a confluence of increasing availability of exotic and specialty food stuffs, a contemporary emphasis on gourmet cooking and the development of increasingly sophisticated food processing machines having a variety of unique and task-specific features. For example, U.S. Pat. Nos. 3,856,220, 4,143,824 and 4,200,244 all disclose various food processor cutting knives which are oriented to improve food cutting and blending action. The designs disclosed therein, however, are incorporated into conventional countertop food processors and thus do not provide the variety of features and advantages of the instant invention.

U.S. Pat. No. 4,095,751 teaches a slicing and cutting apparatus which is also of countertop construction. Here, a drive shaft is mounted for limited axial motion. Such axial motion acts to disconnect the drive motor from the drive shaft unless the food processor and specifically the cutting mechanism is assembled.

U.S. Pat. No. 4,387,860 teaches a countertop food processor having a plurality of accessories and a drive unit which drives the food processing cup and accessories from the top. In order to connect the drive unit to the cutter assembly contained in the food cup, a manually operated knob must be rotated by the user to advance the drive shaft into a driving position after the food cup has been assembled to the processor or retract the drive shaft prior to removal of the food cup from the food processor. Not only is this mechanism complex but the difficulty of assembly of the food cup to the drive unit is time consuming and thus lessens a major advantage of such equipment; namely, time savings.

Aside from the popularity of such devices, there has been a trend in recent years to smaller homes and thus correspondingly smaller kitchens. This trend has placed a premium on counter space. In response to this change, countertop products have become somewhat smaller and the popularity of power units for mixers and food processors flush mounted in countertops has increased.

In spite of the foregoing advances, several consumer requirements have been left unaddressed and improvements in several aspects of such products are possible.

SUMMARY OF THE INVENTION

The instant invention relates to a food processor suitable for various food preparations steps such as cutting, commutating and blending culinary ingredients. The preferred embodiment described below includes a drive unit and at least one food receiving container. The food receiving container includes a cutter assembly disposed for rotation on a driven shaft. The drive unit comprises a housing, drive means such as a electric motor, an output drive member, and a mechanism for moving the output member from a driving position to an uncoupled position when the container is being inserted into the housing. The drive unit output member defines a passageway through which extends a pin which aligns with and abuts the upper end of the driven shaft, thereby inhibiting axial motion thereof. The cutter assembly includes a pair of parallel, spaced apart blades disposed for nutation about the driven shaft such that the upper blade directs food downwardly and the lower blade directs food upwardly. It should be understood that a variety of cutter assemblies and different sizes of food containers may be utilized with the basic drive unit disclosed.

It is thus an object of the instant invention to provide a food processor for securement to the underside of a kitchen cabinet.

It is a further object of the instant invention to provide a food processor having a food containing cup with a cutter assembly which is free to traverse axially along a centrally disposed shaft.

It is a still further object of the instant invention to provide a food processor wherein the cutter assembly disposed within a food container is driven from the top.

It is a still further object of the instant invention to provide a food processor wherein a food container is slidably received within a drive unit and a mechanism automatically interconnects the cutter shaft and drive unit output shaft.

It is a still further object of the instant invention to provide a food processor having a manual release which disconnects the cutter shaft and unit output member such that the food container may be removed from the drive unit.

It is a still further object of the invention to provide a food processor in which the cutter assembly is readily removable from the food container to facilitate food removal and cleaning thereof.

Further objects and advantages of the instant invention will become apparent by reference to the following specification and appended drawings wherein like numerals refer to identical components or elements.

BRIEF DESCRIPTION OF THE DRAWINGS

FIG. 7 is a fragmentary sectional view of a portion of the drive mechanism taken along line 7—7 of FIG. 3;

FIG. 8 is an elevational view in partial section of a cutter assembly of the food processor of FIG. 1;

FIG. 9 is an enlarged top plan view of the cutter assembly shaft of FIG. 8; and

FIG. 10 is a top plan view of the cutter assembly of FIG. 8.

DESCRIPTION OF THE PREFERRED EMBODIMENT

Figure 1:
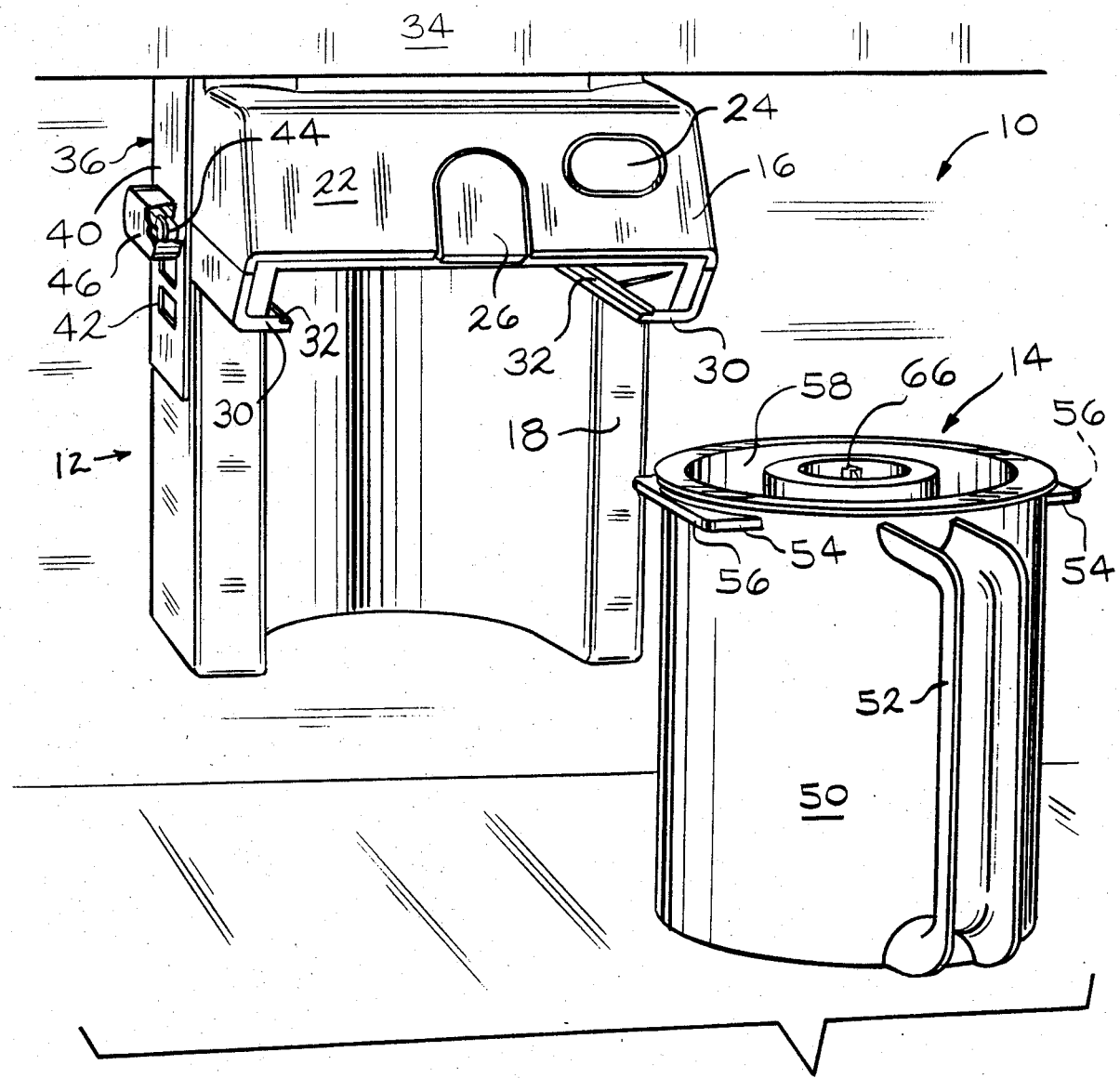
FIG. 1 is a perspective view of a presently preferred embodiment of the food processor of the instant invention.

Referring now to FIG. 1, a food processor for securement to the underside of a kitchen cabinet is illustrated and generally designated by the reference numeral 10. The food processor 10 includes a drive assembly 12 and a food receiving container assembly 14. The drive assembly 12 is generally defined by and enclosed within an upper housing 16 and a lower housing 18. Both the upper and lower housings 16 and 18 are preferably molded of a suitable high impact plastic or other similar and suitable material. Disposed on a forward inclined surface 22 of the upper housing 16 is an on-off switch actuator 24 and a release button 26. The functions of the actuator 24 and release button 26 will be more fully described subsequently. The lower housing 18 includes a pair of parallel spaced-apart lips 30 which define a pair of parallel tracks 32 on their upper surfaces. The parallel tracks slidably receive the food container assembly 14.

Figure 2:
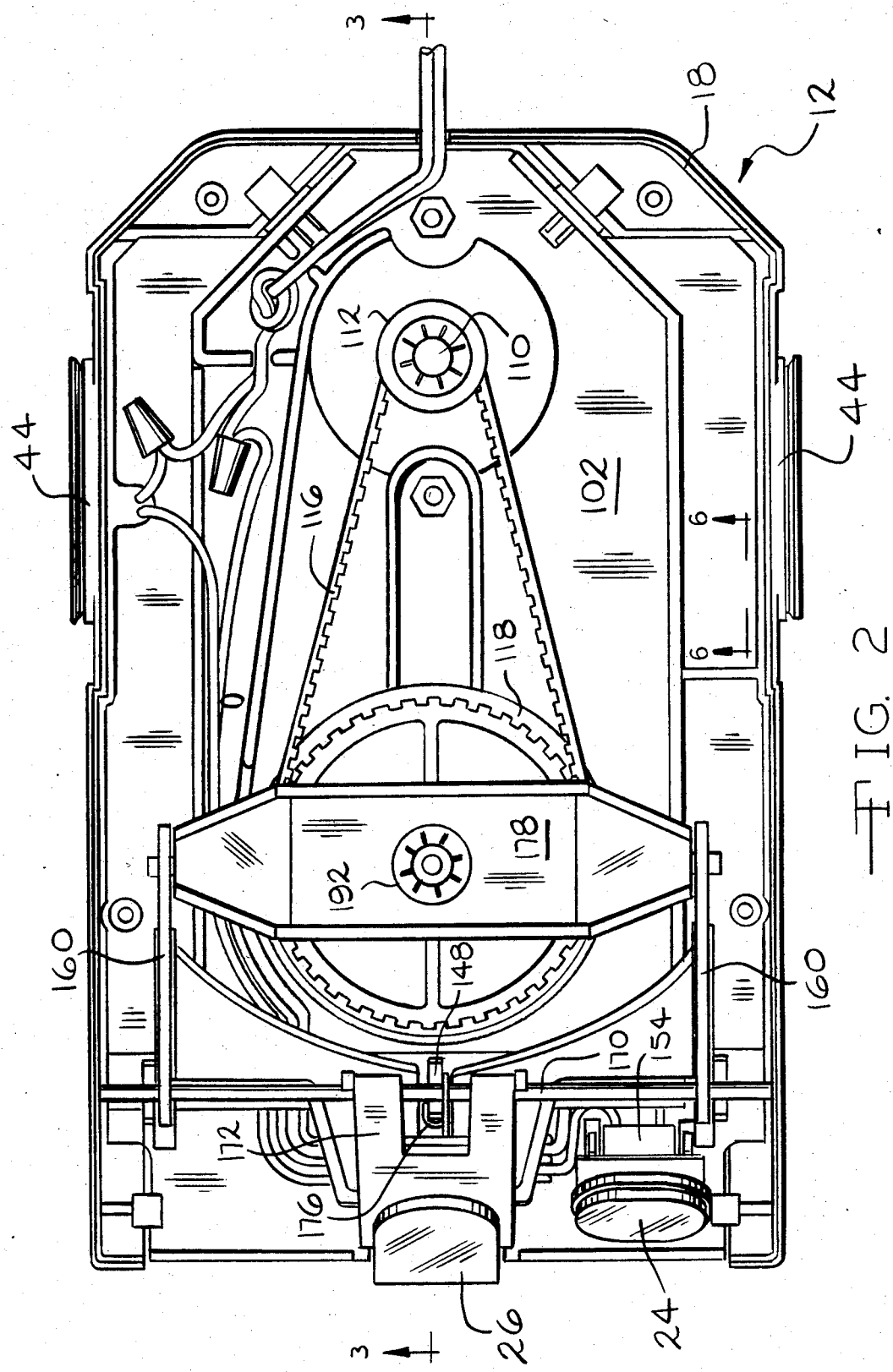
FIG. 2 is a top plan view of the food processor of FIG. 1 with the upper housing removed.
Figure 3:
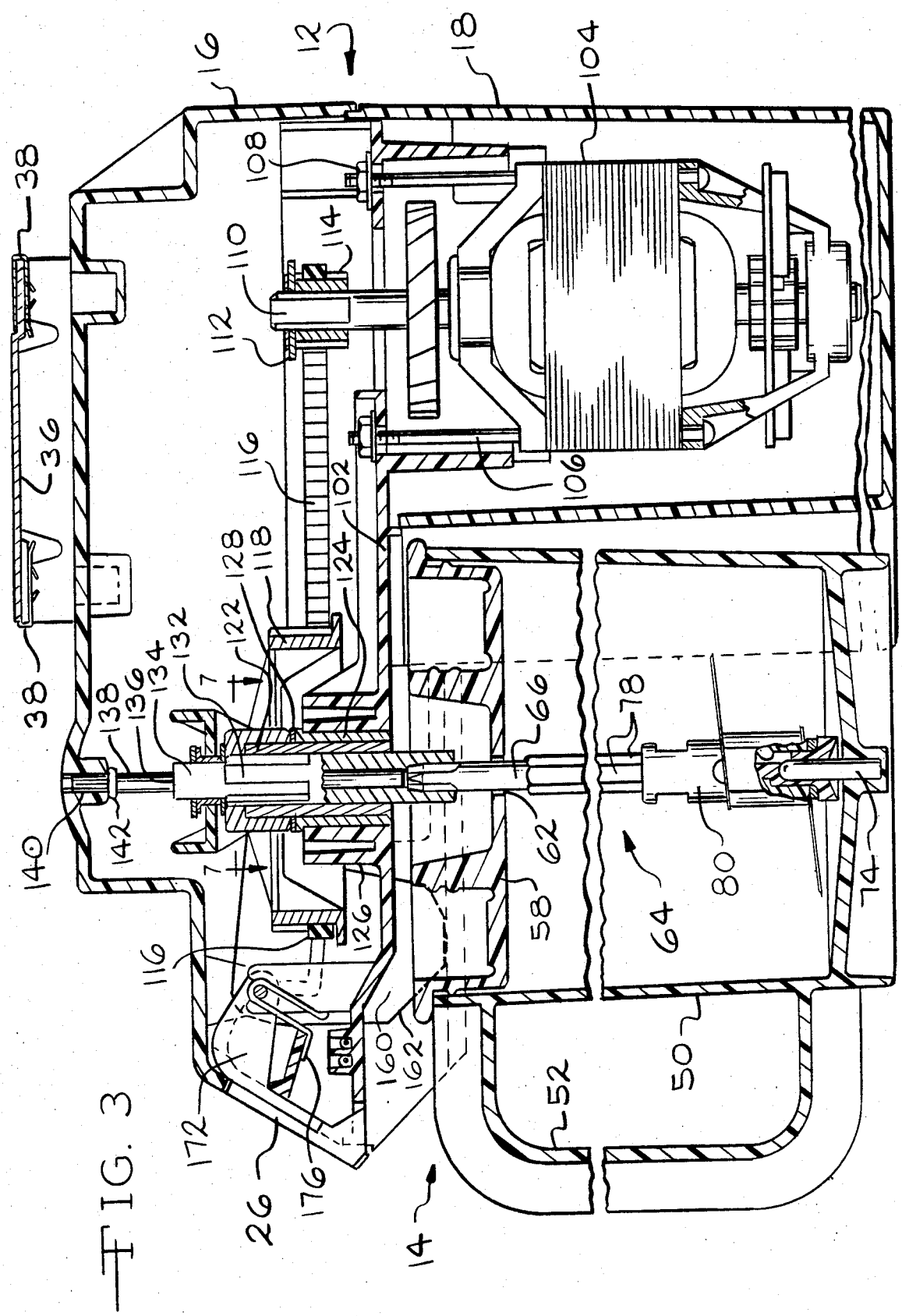
FIG. 3 is a full sectional side view of the food processor of FIG. 1, taken along line 3—3 of FIG. 2.

With reference now to FIGS. 1, 2 and 3, it will be appreciated that the drive assembly 12 is secured to the underside of a cabinet 34 by a generally inverted U-shaped mounting bracket 36. The mounting bracket 36 may include self-threading fasteners 38 which receive suitable threaded fasteners (not illustrated) which are installed through the lower surface of the cabinet 34. Depending upon the material of the cabinet 34, other suitable fastening means such as wood screws or sheet metal screws may be utilized as well. The mounting bracket 36 includes a pair of parallel, vertically depending legs 40 (one of which is illustrated in FIG. 1) and each depending leg 40 defines an equal plurality of like mounting apertures 42. A pair of rectangular bosses 44 project from opposite vertical sidewalls of the lower housing 18 and are received within a selected pair of the apertures 42 and secure the drive assembly 12 relative to the cabinets 34 as will be readily appreciated. A pair of decorative covers 46 are slidably received over the bosses 44 and retain the drive assembly 12 in the mounting bracket 36.

Turning now to FIGS. 1, 3, and 8, the food container assembly 14 includes a generally cylindrical container 50 having a U-shaped vertically disposed handle 52 and a pair of opposed ears 54 which define a pair of parallel marginal edges 56. The ears 54 are received within the tracks 32 defined by the lips 30 of the lower housing. The marginal edges 56 abut the lips 30 and prevent the container 50 from rotating during operation of the food processor 10. The container assembly 14 also includes a removable lid or cover 58 which is snuggly and frictionally received within the inside of the container 50. The cover 58 defines a concentric circular opening 62, as best shown in FIG. 3. Centrally positioned within the container 50 is a cutting assembly 64. The cutting assembly 64 includes a driven shaft 66. The shaft 66 defines a blind aperture 68 at its base into which is press fitted a bushing 70 fabricated of a non-metallic material. In turn, the bushing 70 defines a blind aperture 72 which may receive a stationary center pin 74 secured by, for example, an interference fit into the center of the bottom of the container 50. The pin 74 functions both as a centering device and a rotational pivot for the shaft 66 as will be readily appreciated.

Referring again to FIG. 8, it will be appreciated that the central portion of the shaft 66 defines a plurality of, preferably six, adjacent flats 78 which extend axially along the shaft 66 and thus define a hexagonal cross section. An elongate bushing 82 having a passageway 84 defining a complementary hexagonal cross section is received upon the portion of the drive shaft 66 having the flats 78. The bushing 82 is thus free to slide axially along the shaft but is rotationally coupled to the shaft 66 and thus rotates with it. The bushing 82 includes a pair of lugs 86 in diametric opposition defining upper and lower parallel inclined surfaces. Disposed on the upper surface of the pair of lugs 86 is an upper cutting blade 88 and, disposed on the lower surface of the lugs 86 and parallel to the upper cutting blade 88, is a lower cutting blade 90. The cutting blades 88 and 90 are secured to the lugs 86 by rivets 92 or other suitable fastening means and are oriented at a large acute angle of between 83° and 87° and preferably about 85° to the axis of the shaft 66. Each of the blades 88 and 90 includes an upper oblique or beveled surface 94 and a serrated cutting edge 96.

The upper blade 88 is positioned relative to the bushing 82 such that the majority of the blade 88 is above a reference plane extending normal to the axis of the driven shaft 66 and passing through the point of intersection of the plane of the blade 88 with such shaft axis. Similarly, the lower blade 90 is positioned relative to the bushing 82 such that the majority of the blade 90 is below a reference plane extending normal to the axis of the driven shaft 66 and passing through the point of intersection of the plane of the blade 90 with such shaft axis. By way of further explanation, the blades 88 and 90 may be considered to be vertically separated portions of a nutating disc which rotates with the shaft 66. The upper blade 88 is oriented such that its lower surface is presented to the food and urges it downwardly and the lower blade 90 is oriented such that its upper surface is presented to the food and urges it upwardly when the driven shaft 66 is rotated (clockwise as viewed in FIG. 10) such that the cutting edges 96 of the blades 88 and 90 are the leading edges.

Referring now to FIGS. 8 and 9, the shaft 66 also includes a plurality of male splines 98, preferably four, each having an oblique upper surface 100. The operation of the splines 98 will be more fully described below.

Turning now to FIGS. 2 and 3 and the construction of the drive assembly 12 illustrated therein, it will be apparent that the upper and lower housings 16 and 18, respectively, and a subchassis 102, include various bosses, channels, reliefs, apertures, and the like useful for the positioning and securement of various internal components. Disposed in the rear of the lower housing 18 is an electric motor 104. The electric motor 104 includes mounting bolts 106 and suitable fasteners disposed thereon such as nuts 108 which secure the electric motor and its output shaft 110 in a vertical orientation to the subchassis 102 within the drive unit 12. The electric motor 104 is conventional and is of a fractional horsepower size which provides suitable power on an intermittent basis for the requirements of food processing. Secured to the output shaft 110 is a drive pinion 112 having a fluted drive surface 114 which engages a complementarily configured timing belt 116. The timing belt 116 extends about and transfers power from the electric motor 104 to a complementarily configured driven pulley 118. The driven pulley 118 is press fitted to an elongate bushing 122 which rotates therewith. The bushing 122 is slidably and rotationally received within a suitably sized shoulder bushing 124 which is securely received within a suitably sized circular projection 126 formed in the subchassis 102. A washer 128 positioned between the abutting faces of the central hub of the pulley 118 and the bushing 124 acts as a thrust bearing and friction reducing element. As illustrated in FIG. 7, the pulley 118 includes a pair of opposed, inwardly projecting splines or lugs 130 which engage a complementarily disposed pair of narrow splines or lugs 132 disposed on the outer surface of a stub drive shaft 134. The interaction between the inwardly projecting lugs 130 and outwardly projecting lugs 132 transmit rotational energy between the pulley 118 and the stub shaft 134 while at the same time providing a limited amount of rotational play therebetween. At the lower portion of the stub shaft 134 are a plurality, preferably four, female splines 135 which are complementary to and mate with the male splines 98 disposed on the upper portion of the driven shaft 66. The stub shaft 134 defines a through passageway 136 which receives a fixed positioning pin 138. The pin 138 is received within and secured by a press or interference fit to an aligned, suitably positioned aperture 140 in the upper housing 16. Primarily, the positioning pin 138 restrains the shaft 66 from excessive vertical motion, as is illustrated in FIG. 3, but it assists in the support and positioning of the driven pulley 118 and associated drive components as well. The vertical position of the lower end of the positioning pin 138 is assured by driving a rolled shoulder 142 positioned adjacent the upper end of the positioning pin 138 into contact with the upper housing 16.

Referring now to FIGS. 2, 3, 4, and 5, the connect and release operator assembly 144 will be described. It will be appreciated that the subchassis 102 defines a pair of parallel slots 146 and has a plurality of aligned stanchions 148 each defining a shaft receiving passageway 150 adjacent its terminal portion. Mounting stanchions 152 for the on-off switch 154 (illustrated in FIG. 2) are also secured to or integrally molded with the subchassis 102. The operator assembly 144 further includes an operator stirrup 158 having a pair of parallel plates 160 which define cam edges 162, a pair of circular apertures 164 and a pair of teardrop-shaped apertures 166. The circular apertures 164 are disposed in alignment with the passageways 150 of the stanchions 148 and a suitably sized elongate pivot pin 170 is seated within the passageways 150 and apertures 164 to pivotally secure the operator stirrup 158 to the subchassis 102. The release button 26 generally defines a yoke-like structure having a pair of arms 172 each defining suitably sized apertures 174 adjacent their terminal portions which receive the pivot pin 170 therethrough. Preferably, the arms 172 of the release button 26 straddle the center stanchion 148. A formed wire spring 176 disposed between the center stanchion 148 and the underside of the center of the operator stirrup 158 biases the operator stirrup 158 and release button 26 toward the positions illustrated in FIG. 3.

Figure 4:
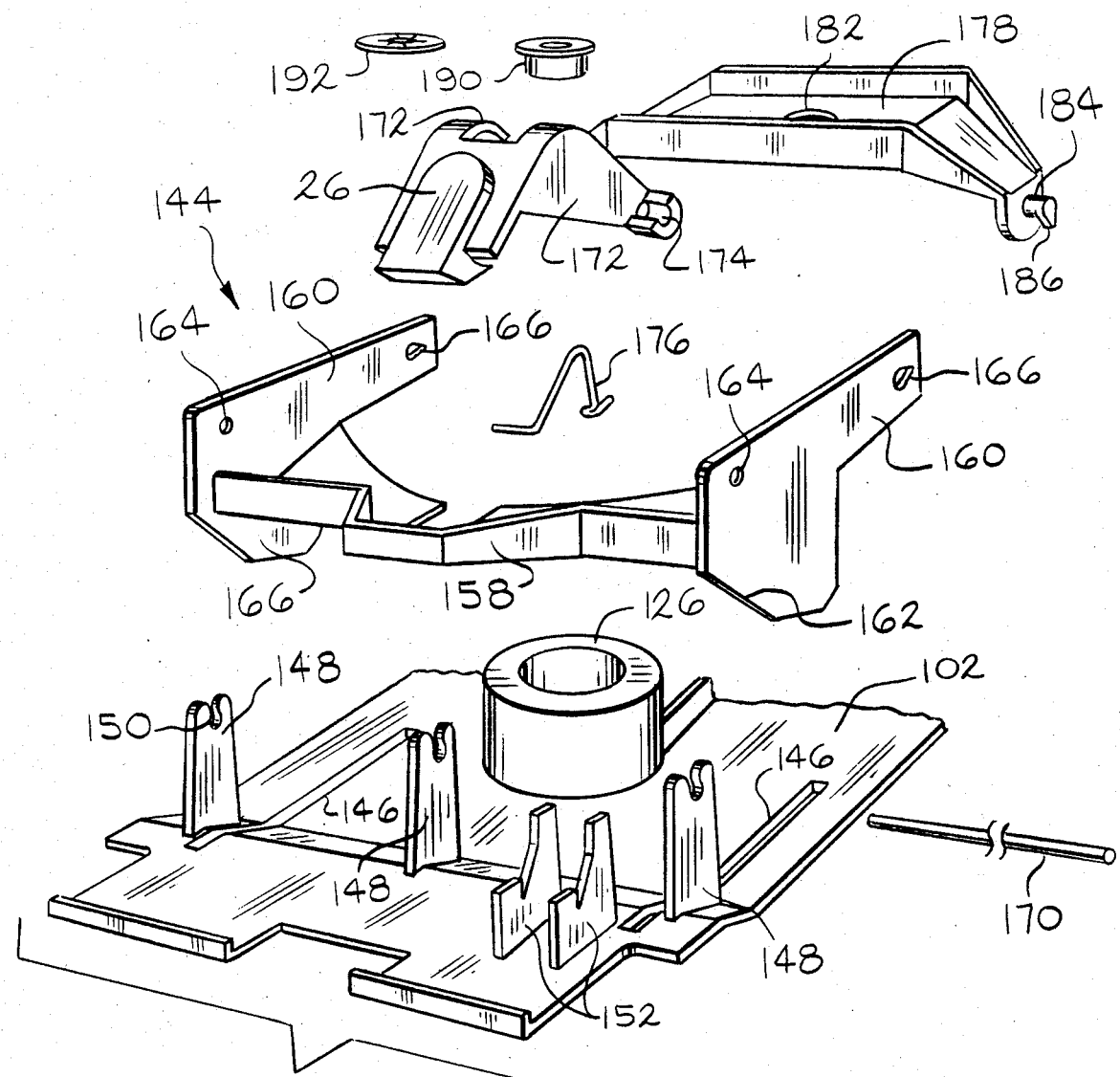
FIG. 4 is an exploded perspective view of the operator mechanism of the food processor of FIG. 1.
Figure 5:
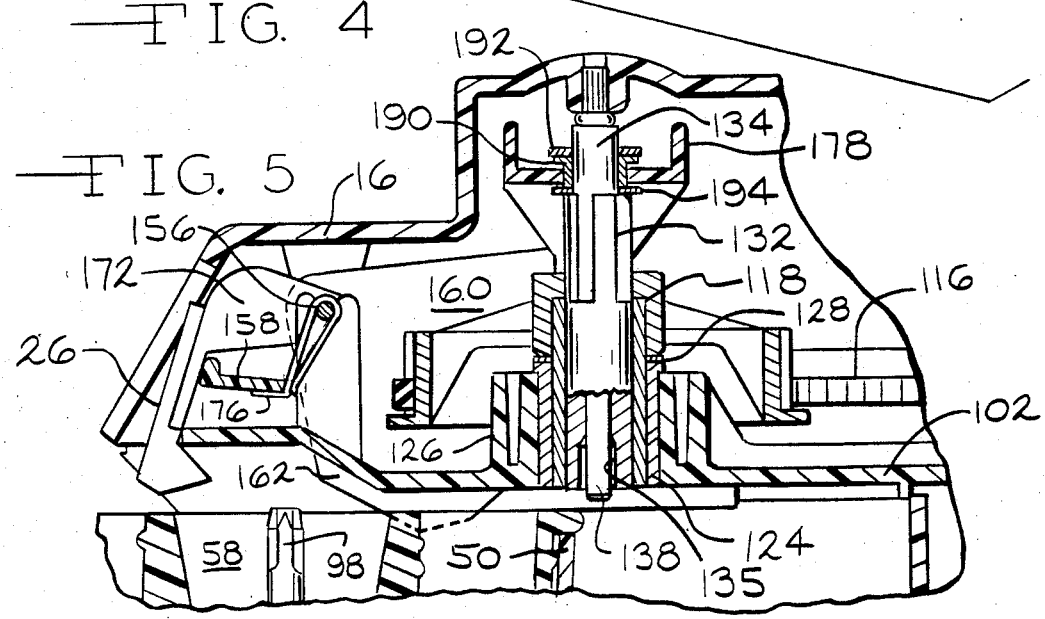
FIG. 5 is a fragmentary sectional view of the operator mechanism of the food processor of FIG. 1 in the release position.

Finally, the operator assembly 144 includes a bridge 178 defining a centrally disposed aperture 182 and a pair of aligned projections 184 (one of which is illustrated in FIG. 4) having teardrop-shaped terminal portions 186. The pair of teardrop-shaped terminal portions 186 seat within the pair of teardrop-shaped apertures 166 and, when rotated 90° to the positions generally illustrated in FIG. 4, retain the bridge 182 within the operator stirrup 158. Positioned concentrically about the stub shaft 134 and received within the aperture 182 of the bridge 198, is a shoulder bushing 190. The shoulder bushing 190 acts as a bearing between the rotating stub shaft 134 and the bridge 178. A retaining ring 192 or similar structure such as a collar and set screw is pressed over the end of the stub shaft 134 and axially positions the stub shaft 134 relative to the bushing 190 and the bridge 178. Preferably, a washer 194 is placed between the lower surface of the bushing 190 and the upper surface of the pulley 118 as illustrated in FIG. 5.

Figure 6:
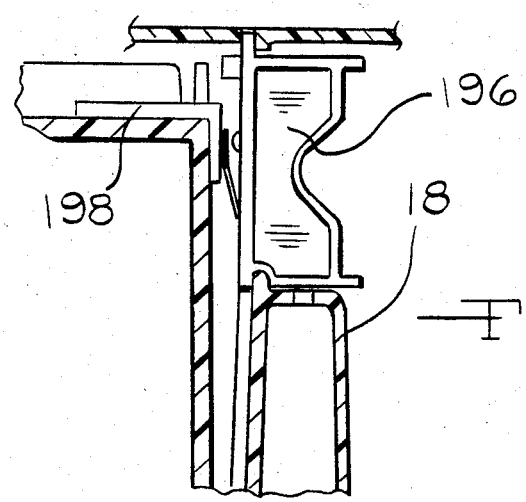
FIG. 6 is a fragmentary sectional view of a safety interlock mechanism taken along line 6—6 of FIG. 2.

Finally, with reference to FIGS. 2 and 6, a safety switch is connected in series with the electric motor 104 and the on-off switch 154. The safety switch 196 is positioned generally adjacent the rearward end of the right hand track 32 in the lower housing 18. The safety switch may be any low operating force, momentary contact design switch. An actuator tab 198 senses that the container 50 is fully seated, closing the normally open contacts of the safety switch 196 so long as this condition exists.

The operation of the food processor 10 will now be briefly described with reference to FIGS. 1, 3, 4, 5, and 8. Initially, the food container assembly 14 is removed from the drive assembly 12 as illustrated in FIG. 1. The cover 58 is removed from the container 50 as is the cutting assembly 64. Food to be processed is placed within the container 50, the cutting assembly 64 is then replaced in the container 50 by positioning the shaft 66 and specifically the bushing 70 onto the pin 74 in the container 50. It will be appreciated that the cutting blades 88 and 90 will generally be resting on the upper surface of the food disposed in the container 50. At this time the cover 58 is replaced on the container 50, care being taken to ensure that the upper portion of the shaft 66 is received within and passes through the opening 62 in the cover 58. Next, the container assembly 14 is generally positioned as illustrated in FIG. 1, with the right and left ears 54 generally aligned with the right and left tracks 32, respectively. As the food container assembly 14 is advanced into the drive assembly 12, the cam edges 162 of the operator stirrup 158 contact the edge of the container 50 and, as it is further advanced into the drive assembly 12, begin to rotate the operator stirrup 158 about the axis of pivot defined by the pivot pin 170. This action raises the bridge 178 and with it the stub drive shaft 134. The positions of the elements of the operator assembly 144 are then as illustrated generally in FIG. 5 (with the exception of the release button 26).

The components of the operator assembly 144 remain generally in these positions until the food container assembly 14 is fully seated within the drive assembly 12 as illustrated in FIG. 3. In this position, the cam edges 162 of the operator stirrup 158 relax adjacent the cover 58 permitting the bridge 178 and the stub drive shaft 134 to drop and engage the drive shaft 66. Such motion is assisted by the formed wire spring 176. At this time both the rotational play provided by the lugs 130 on the pulley 118 and the lugs 132 on the stub shaft 134 and the action provided by the oblique surfaces 100 of the splines 98 assist in coupling the stub shaft 134 to the driven shaft 66. As will be noted in FIG. 3, the plates 160 engage the ears 54 of the food container assembly 14 and generally assist in retaining the container assembly 14 within the drive assembly 12. It will be appreciated that at this time the safety switch 196 is actuated. The food processing cycle may then be initiated by appropriate movement of the on-off switch actuator 24.

Upon such actuation, the blades 90 and 92 will commence rotation. Since, as previously noted, they will begin generally at the top of the food disposed within the container 50, and are free to slide axially along the driven shaft 66, as the blades 88 and 90 rotate, they will descend through the food to be processed ending in the position generally illustrated in FIG. 3. As they descend, however, the orientation of the lower blade 90 relative to the driven shaft 66 and the beleved surface 94 is such that food will tend to be thrown upwardly therefrom, into the path of the upper blade 88 since the upper surface of the lower blade 90 is presented to the food. When the blades 88 and 90 have fully descended through the food into the position illustrated in FIG. 3, the upwardly directed movement of the food is especially important in moving the food away from the lower surface of the container 50 and into the path of the upper blade 88. The upper blade 88 is oriented such that food is directed into the path of the lower blade 90 since the lower surface of the upper blade 88 is presented to the food and such ensures the complete and uniform processing of the food within the container 50.

At the completion of the processing cycle, the on-off switch actuator 24 is returned to the off position and the release button 26 is manually depressed. Once again, the operator stirrup 158 rotates about the pivot pin 170 and the bridge 178 rises to release the stub drive shaft 134 from engagement of the driven shaft 66 of the food container assembly 14. The elements of the drive assembly 12 and particularly the operator assembly 144 are then as illustrated in FIG. 5. At this time, the food container assembly 14 may be removed from the drive assembly 12 by simply pulling it from the drive assembly 12. The food processing operation is complete and the cover 58 may be removed from the container 50. Likewise, the cutting assembly 64 may be removed from the container 50 to facilitate removal and recovery of all of the processed food within the container 50 and cleaning, as well.

It will be appreciated that containers of sizes other than those illustrated may be used with the drive assembly 12 and further that blade and cutting assemblies other than those illustrated are likewise adaptable to the instant invention. Furthermore, since the bushing 82 and the blades 88 and 90 secured thereto are slidable and thus removable from the shaft 66, other cutting assemblies may be utilized with the shaft 66 and vice versa.

The foregoing disclosure is the best mode devised by the inventors for practicing this invention. It is apparent, however, that devices incorporating modifications and variations will be obvious to one skilled in the art of food preparation equipment. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A food processor comprising, in combination,
    means for containing a quantity of material, a cutter assembly disposed within said containing means, shaft means for rotating said cutter assembly,
    a housing having means for receiving said containing means,
    drive means disposed within said housing and having an output member for driving said shaft means, said output member defining a rotational axis and movable between a first, driving position and a second, uncoupled position,
    guide means, included in said receiving means, for guiding said containing means in a selected direction, nonparallel with respect to said rotational axis, as the containing means is being inserted in said housing,
    means actuated by said containing means for moving said output member between said first position and said second position while said containing means is being inserted in said housing,
    said output member positioned to obstruct movement of the containing means in the guide means when in the first position and to allow movement of the containing means in the guide means when in the second position,
    said moving means operating to move the output member to the second position to allow the containing means to be inserted in the housing and to move the output member to the first position, into engagement with said shaft means, after the containing means has been inserted in the housing.

2. The food processor of claim 1 wherein said shaft means defines a plurality of axially extending flats and said cutter assembly includes a bushing defining a passageway having complementarily disposed flats and at least a pair of blades disposed parallel to one another and at a large acute angle to the axis of said shaft.

3. The food processor of claim 1 wherein said cutter assembly includes a first and second blade disposed on said shaft means, said first blade and said second blade defining first and second parallel planes and said shaft means defining an axis, said first blade positioned substantially above a reference plane disposed normal to the axis of said shaft at the point of intersection of said plane of said first blade and said shaft, and said second blade positioned substantially below a reference plane disposed normal to the axis of said shaft at the point of intersection of said plane of said second blade and said shaft, such that each blade deflects material being processed in the containing means towards the other blade when the cutter assembly is rotated in a selected direction by the drive means.

4. The food processor of claim 1 wherein said output drive member and said shaft means include complementary engageable splines.

5. The food processor of claim 1 wherein said output member defines a through passageway and positioning pin is fixedly mounted to said housing to extend through said through passageway and is disposed proximate the upper end of said shaft means when said containing means is positioned within said receiving means of said housing.

6. The food processor of claim 1 wherein said means for moving said output member includes a pair of cam surfaces positioned for displacement during insertion of said containing means into said containing receiving means and means for coupling said output drive member to said cam means.

7. The food processor of claim 1 wherein said cutter assembly includes a bushing defining an aperture for axially, slidably receiving said shaft means, wherein said cutter assembly is slidable along the length of the shaft means, and wherein said cutter assembly comprises means for coupling the cutter assembly to rotate with the shaft means as the cutter assembly slides along the length of the shaft means.

8. The food processor of claim 1 wherein the selected direction is substantially transverse to the rotational axis.

9. A food processor comprising, in combination, means for containing a quantity of food material, a cutting assembly disposed within said containing means, shaft means for supporting and rotating said cutting assembly, said shaft means extending out of the top of said container, a housing having means for receiving said containing means in a driving position, drive means for rotating said shaft means about a rotational axis and said cutting assembly having an output member engageable with said shaft means and movable between a first, engaged position and a second, disengaged position, means for biasing said output member to the first, engaged position;

guide means, included in said receiving means, for guiding said containing means in a selected direction as said containing means is being inserted in said housing, wherein said selected direction is nonparallel with respect to said rotational axis, and wherein said guide means holds said containing means beneath said drive means when said containing means is in said driving position;

means for automatically displacing said output member from said first position to said second position as said containing means is moved in said selected direction to said driving position in said guide means in order to remove said output member from the path of the containing means, and means for manually displacing said output member from said first position to said second position in order to allow the containing means to be removed from the driving position.

10. The food processor of claim 9 wherein said shaft means defines a plurality of axially extending flats and said cutting assembly includes a bushing defining a passageway having complementarily disposed flats and at least a pair of blades disposed parallel to one another and at a large acute angle to the axis of said shaft, said flats on the shaft means extending along substantially the entire length of the containing means such that the bushing is rotationally coupled to the shaft means as the bushing slides along the shaft means over the length of the containing means.

11. The food processor of claim 9 wherein said cutting assembly includes a first and a second blade disposed in parallel on said shaft means, said first blade being positioned above said second blade and said second blade including a beveled surface means for directing food toward said first blade.

12. The food processor of claim 9 wherein said output drive member and said shaft means incude complementary engageable splines.

13. The food processor of claim 9 wherein said output member defines a through passageway and a positioning pin is fixedly mounted to said housing to extend through said through passageway and is disposed proximate the upper end of said shaft means when said containing means is positioned within said receiving means of said housing.

14. A food processor for under cabinet mounting comprising, in combination, a food receiving container, a cutting assembly having at least a pair of blades and a shaft for supporting and rotating said blades, a housing having means for receiving said container in a driving position situated beneath said housing, drive means disposed within said housing for rotating said cutting assembly, said drive means having an output member rotatable about a rotational axis engageable with said shaft, and movable between a first, lowered position and a second, raised position, guide means, included in said receiving means, for guiding said container in a selected direction, nonparallel with respect to said rotational axis, as the container is being inserted in said housing, cam means mounted on the housing and engageable by said food container for momentarily moving said output member from said lowered to said raised position as said food container is moved into said driving position in order to prevent said output member from obstructing movement of the food container into the driving position.

15. The food processor of claim 14 wherein said cam means includes a pair of cams depending from said housing, each positioned to be actuated by a respective side of the food container.

16. The food processor of claim 14 further including means for manually displacing said output member from said first, lowered to said second, raised position.

17. The food processor of claim 14 wherein said shaft has a hexagonal cross section over substantially the entire length of the food container and wherein said blades are secured to a bushing defining an aperture of hexagonal cross section such that the bushing is rotationally coupled to the shaft while free to slide along the shaft.

18. The food processor of claim 14 further including means for limiting the axial movement of said shaft when said container is disposed in said driving position.

19. The food processor of claim 14 further comprising means for biasing the output member to the first, lowered position.

* * * * *